United States Patent [19]
Garner

[11] 3,768,794
[45] Oct. 30, 1973

[54] ENERGY ABSORBING SPRING DEVICE

[75] Inventor: Philip O. Garner, La Puente, Calif.

[73] Assignee: Litton Industries, Inc., Beverly Hills, Calif.

[22] Filed: Feb. 2, 1972

[21] Appl. No.: 222,936

[52] U.S. Cl. ................................. 267/74, 264/150
[51] Int. Cl. ......... F16f 1/08, F16f 1/12, F16f 13/00
[58] Field of Search ................. 267/69, 73, 74, 150; 256/39

[56] References Cited
UNITED STATES PATENTS

| | | | |
|---|---|---|---|
| R26,417 | 6/1968 | Kaplan | 267/71 |
| 519,995 | 5/1894 | Frisbee | 256/39 |
| 880,817 | 3/1908 | Nunnely | 267/71 |
| 1,594,962 | 8/1926 | Jacobs | 267/74 |
| 2,568,149 | 9/1951 | Grabe | 267/71 X |
| 200,561 | 2/1878 | Moore | 267/69 X |
| 181,390 | 8/1876 | Armstrong | 267/74 |
| 2,248,447 | 7/1941 | Wood | 267/73 X |
| 644,221 | 2/1900 | Wirt | 267/69 |

*Primary Examiner*—Gerald M. Forlenza
*Assistant Examiner*—Howard Beltran
*Attorney*—A. C. Rose et al.

[57] ABSTRACT

A spring device with a pair of elongated members where each member holds the coils of the spring in a predetermined spaced relationship by connecting to the coils at substantially opposite points in each coil. The connection of the elongated members to each coil of the spring divides each coil into a pair of separately acting spring segments. Parallel relative motion of the elongated members in response to opposing forces applied to them results in the bending of each spring segment from a first shape in a rest position to a second shape. As the amount of force applied to the members increases in a linear fashion the amount of parallel relative motion for a unit amount of force decreases; thus, providing a non-linear energy absorbing device.

17 Claims, 9 Drawing Figures

Patented Oct. 30, 1973

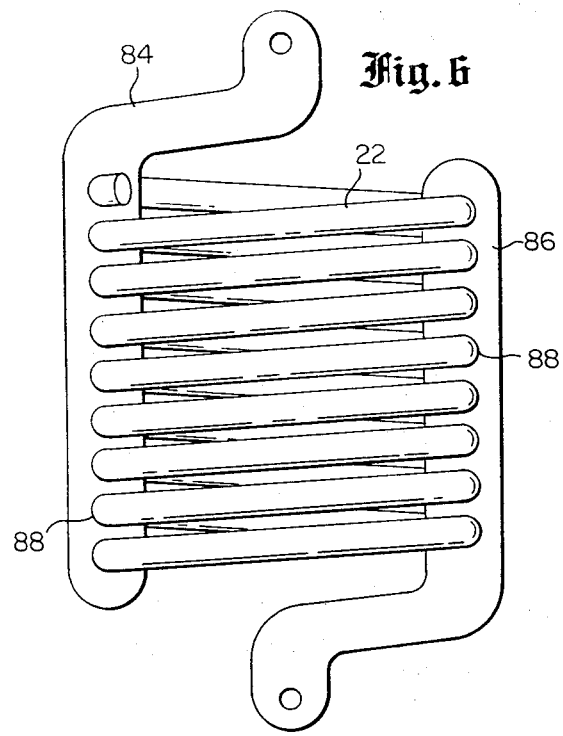
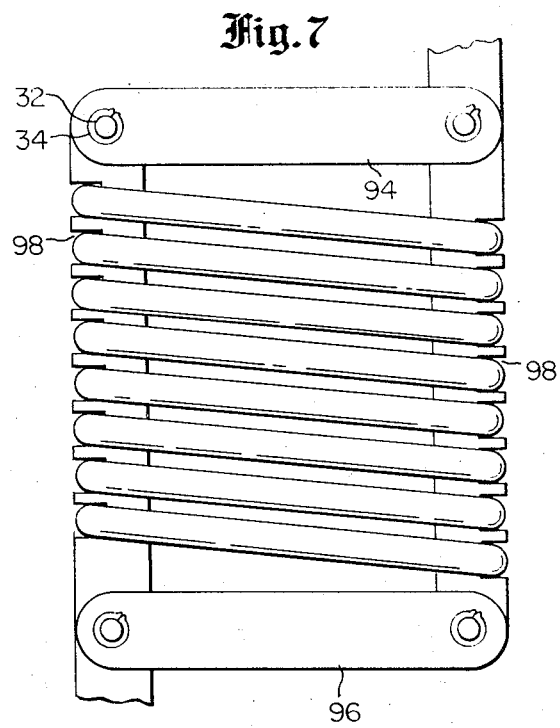
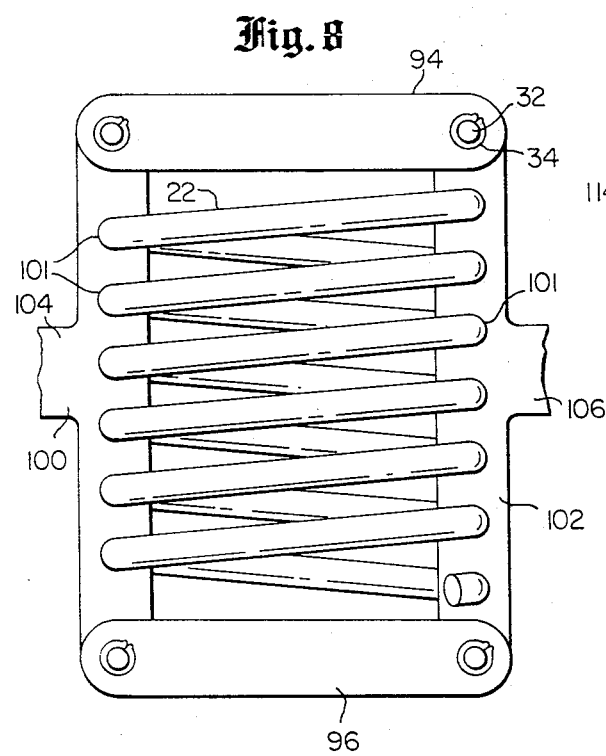
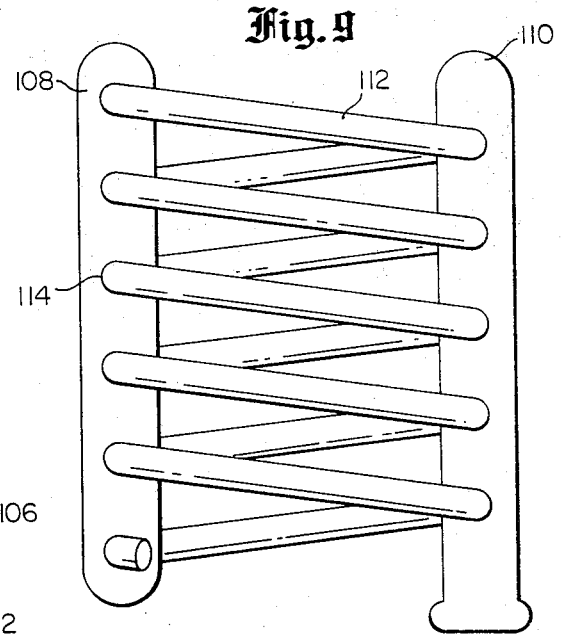

ENERGY ABSORBING SPRING DEVICE

BACKGROUND OF THE INVENTION

This invention pertains to the art of fabricating springs for absorbing energy. In the prior art, coil springs have been utilized for storing energy by compressing, stretching, bending or twisting the spring or by a combination of these methods. Using any one of these methods, energy is stored in a spring in a linear relationship to the amount of deflection by the spring. For some applications, it is desirable to have a device which is capable of storing energy over an extreme range of variations in the force applied. For such applications, a spring having a linear response rate may not be adequate to absorb energy over the full range of force variations.

SUMMARY OF THE INVENTION

A spring device for storing energy having a pair of elongated members in juxtaposition, a plurality of spring segments for storing energy and a means for connecting each spring segment between the pair of members. The members have substantially parallel longitudinal axes and exhibit parallel motion with respect to one another in response to the application of opposing forces acting on the members in the direction of the longitudinal axes. Each spring segment has a first shape in the absence of opposing forces on the members and bends to a second shape for storing energy in response to relative movement of the members in the direction of the longitudinal axes. For each unit increase of parallel relative motion between the members, the device exhibits a non-linear response rate that absorbs energy exponentially. Thus, the device will absorb energy over a wider range of variations in force than a device limited to a linear response. An increase in the ability to absorb energy means, of course, that for a given energy level to be absorbed, a smaller, and perhaps less costly, device may be utilized. In some applications, a non-linear responding device of the invention may be an alternative to the use of two linear responding devices of the prior art.

It is therefore an object of the invention to provide an energy absorbing device which absorbs energy at a non-linear response rate.

It is another object of the invention to provide a device which absorbs energy by alternately bending and unbending the successive segments of each coil in a coil spring.

It is still another object of the invention to provide a device which absorbs energy by the alternate bending and compression, and bending and tension of successive segments of each coil in a coil spring.

It is a further object of the invention to provide a non-linear energy absorbing device by the bending, compressing or expanding each successive spring segment from a first unloaded shape to second shape under load.

It is a further object of the invention to provide an energy absorbing device which bends each successive spring segment from a first unloaded shape to a second expanded or compressed second loaded shape, where expansion or compression depends on the duration of the applied force.

DESCRIPTION OF THE PREFERRED EMBODIMENTS

FIG. 6 is a view in side elevation of an embodiment of the invention without linkages connecting the members.

FIG. 7 is a view in side elevation of an embodiment of the invention using individual rings.

FIG. 8 is a view in side elevation of another embodiment of the invention.

FIG. 9 is a view in side elevation of yet another embodiment of the invention.

DESCRIPTION OF THE PREFERRED EMBODIMENTS

Figure 1:
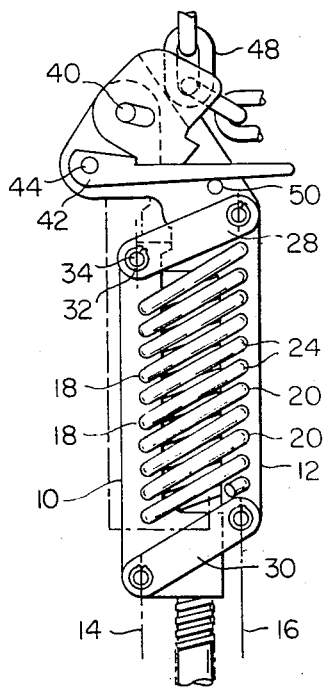
FIG. 1 is a side elevational view of a portion of a chain lashing embodiment of the invention.

In FIGS. 1–4, there is shown one embodiment of the invention. Each of a pair of elongated members 10 and 12 has a respective longitudinal axes 14 and 16. In the embodiment shown in FIGS. 1 and 2, longitudinal axes 14 and 16 are parallel. Member 10 has a plurality of holes 18 spaced along longitudinal axis 14; similar, member 12 has a plurality of holes 20 spaced along its longitudinal axis 16. A helical spring 22 is held by members 10 and 12 by threading the spring first through a first hole 18 in member 10, then through a first hole 20 in member 12, then through the next hole 18 in member 10 and so on until every coil in the spring threads a hole 18 and a hole 20. Each coil of the helical spring is thus divided into a pair of spring segments by a hole 18 and a hole 20 which are the respective points of contact of each coil with member 10 and member 12. The spacing of holes 20 is such that a spring segment has a freedom of travel until it meets an adjacent segment. In this embodiment, the spacing of the hole is not so great so that the elastic limit of the spring is exceeded before the travel of each segment is stopped by an adjacent segment. Each spring segment on one side of a plane defined by a surface including both longitudinal axes 14 and 16 is identified as a first segment 24. Each segment of each coil on the other side of this plane defined by longitudinal axes 14 and 16 is identified as a second segment 26. The significance of identifying first and second segments of each coil is described below in the discussion of the operation of the device.

In the embodiment shown in FIGS. 1–4, members 10 and 12 are pivotally connected by an upper pair of linkages 28 and 29 and a lower pair of linkages 30 and 31. In this embodiment, upper and lower linkages have the same length but this is not mandatory. Also, the length of the linkages is preferably substantially equal to the mean diameter of each spring segment 24 and 26 of helical spring 22. Linkages 28–30 are each pivotally connected between members 10 and 12 by a pair of pins 32. Each pin 32 threads a hole on one end of a linkage and on one end of a member and is held in place by a keeper 34. Of course, only one upper and one lower linkage could be utilized. To supply explanation of the device, only one upper and one lower linkage will be referred to in the discussion below. A pair of pins 32 passing through each member 10 are located on longitudinal axis 14. Similarly, the pair of pins 32 passing through member 12 are located along the longitudinal axis 16. Also, the spacing between the pins 32 passing through member 10 is equal to the spacing between the pins passing through member 12. Since in this embodiment the linkages have the same length, the shape formed by members 10 and 12 and linkages 28 and 30 is a parallelogram. However, it is a parallelogram with adjustable angles between its sides since linkages 28 and 30 are pivotally mounted between members 10 and 12. The application of opposing forces to members 10 and 12 in the direction of the longitudinal axes 14 and 16 will cause the shape of the parallelogram formed by members 10 and 12 and by linkages 28 and 30 to change, and the segments of helical spring 22 to bend in the manner discussed below.

Figure 2:
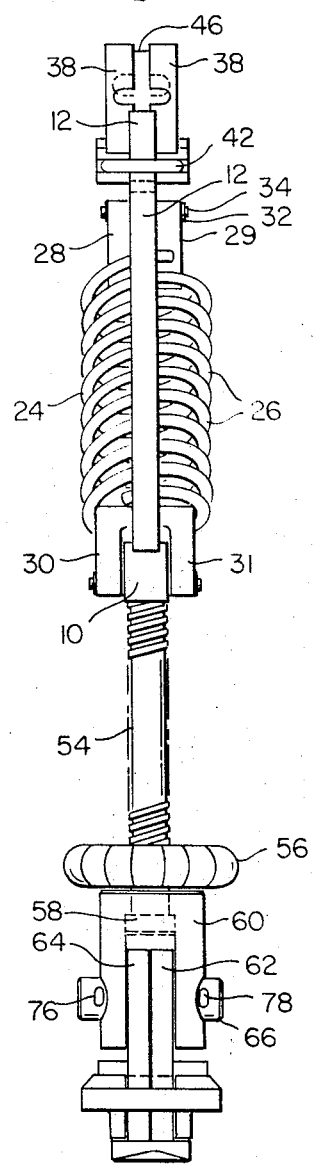
FIG. 2 is the front elevational view of the chain lashing embodiment.
Figure 3:
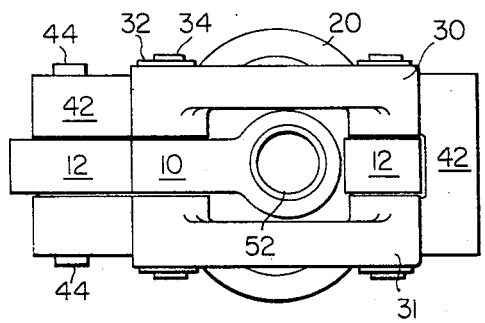
FIG. 3 is an end view of the chain lashing embodiment.

The embodiment of the invention shown in FIGS. 1-4 includes means for applying forces to member 10 and 12. One use of this embodiment is a chain lashing assembly. Member 12 terminates in what is known as a hook or a claw, as shown in FIGS. 1, 2 and 3. Hook 36 comprises a block 38, a pin 40, a lever 42 and a pin 44. Block 38 has a slot 46 adapted to receive chain 48. Block 38 is pivoted on pin 40. Block 38 may be locked in the closed position by lever 42 which engages block 38 and prevents it from rotating. This embodiment is shown in FIGS. 1 and 2, at the end of a tension stroke. Tension tends to hold chain 38 in block 38. A hole 50 may be included in member 12 for receiving a safety lock (not shown) which may be wire or a cotter pin for preventing undesired rotation of lever 42. When it is desired to release chain 48 from block 38, lever 42 is depressed; thus, permitting block 38 to rotate. Since the pivot point of block 38 is off center from the direction of pull, the pull of chain 48 tends to pull it out of slot 46 in block 38.

A second device applies force to member 10 in the opposite direction from the force applied to member 12. At the opposite end of member 10 from hook 36 there is a threaded hole 52, shown in FIG. 3, for connecting to a turnbuckle comprising threaded rod 54 and hand wheel 56. Rod 54 terminates in a head 58. The embodiment shown in FIGS. 1-4 includes a mounting bracket 60 having a U-shape for connecting to a standard track hole. Head 58 of rod 54 threads a hole in a bracket 60. A pair of rotatable arms 62 and 64 are pivotally mounted in the channel on pin 66. Arm 62 terminates in a flange 68 for engaging one side of track 60 through hole 72. Arm 64 has a similar flange 74. Cotter pins 76 and 78 prevent pin 66 from falling out. Arms 62 and 64 are inserted in hole 72 by rotating the arms so that flanges 68 and 74 are moved sufficiently close to one another to pass through hole 72. Arms 62 and 64 are then rotated in the opposite directions to spread flanges 68 and 74 apart from one another. Flanges 68 and 74 will thus engage track 70. Undesired movement of arms 62 and 64 is prevented by means of a bar 80 and a pin 82. Bar 80 has a slot which permits a limited amount of rotational movement by arms 62 and 64. Pin 82 may be inserted through a hole in arms 62 and 64 for preventing rotational movement of the arms; thus, locking them in hole 72. Track 70 may be attached to an object; subject to intermittent motion such as moored ship. Any movement of the ship would thus apply a force through rod 54 to member 10 in the direction of axes 14 and 16. Of course, the direction of the applied force need not be exactly parallel to the direction of axes 14 and 16. Any force not orthogonal to axes 14 and 16 would have a component in the direction of axes 14 and 16.

Consider now the operation of the novel energy absorbing device of the invention. In the embodiment of the invention shown in FIGS. 1-4, the holes 18 in member 10 and the holes 20 in member 12 divide each coil of helical spring 22 into alternate first segments 24 and second segments 26. Each first segment 24 and each second segment 26 of each coil has a first shape in the absence of opposing forces on members 10 and 12. For the symmetrical helical spring 22 this first and second shape is circular. The rest position of the device in the absence of opposing forces is shown in FIG. 1 in phantom. Upon application of a force to member 10 in the direction of axes 14 and 16, the parallelogram formed by members 10 and 12 and linkages 28 and 30 changes shape. Member 10 experiences relative motion with respect to member 12 from its initial position shown in phantom in FIG. 1 to the position shown in FIG. 1. However, members 10 and 12 are not free to move without affecting the shape of the coils of helical spring 22. In response to the relative motion of members 10 and 12, each first segment 24 and each second segment 26 is bent from its first circular shape. For the motion illustrated in FIG. 1, each first segment is bent into a first elliptical shape and each second segment is bent into a second elliptical shape. Each first segment 24 bends in tension into a first elliptical shape having a major axis in a plane surface which includes axes 14 and 16. In other words, each first segment is deflected from a circular shape to increase its curvature. In response to the relative motion illustrated in FIG. 1, each second segment 26 bends into a second elliptical shape. Each second segment 26 is bent in compression into this second elliptical shape which has a minor axis in a plane surface, and which includes axes 14 and 16. In other words, each second segment 26 is deflected from its first circular shape to decrease its curvature; thus, spring 22 is caused to absorb energy in each segment 24 and 26.

Figure 5:
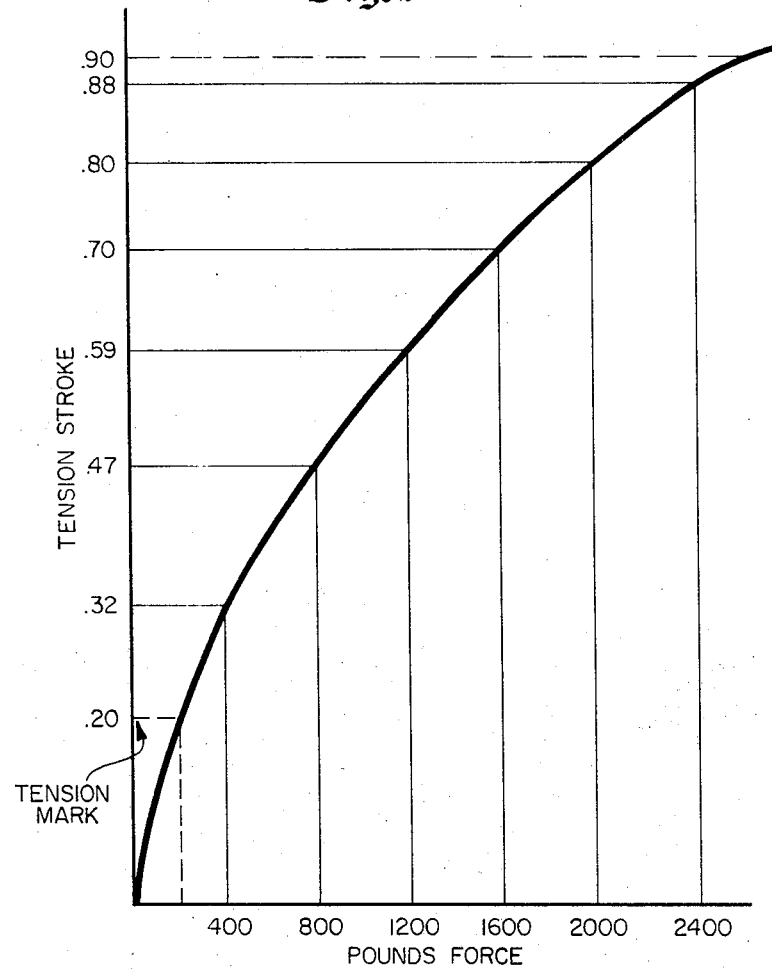
FIG. 5 is a graph.
Figure 4:
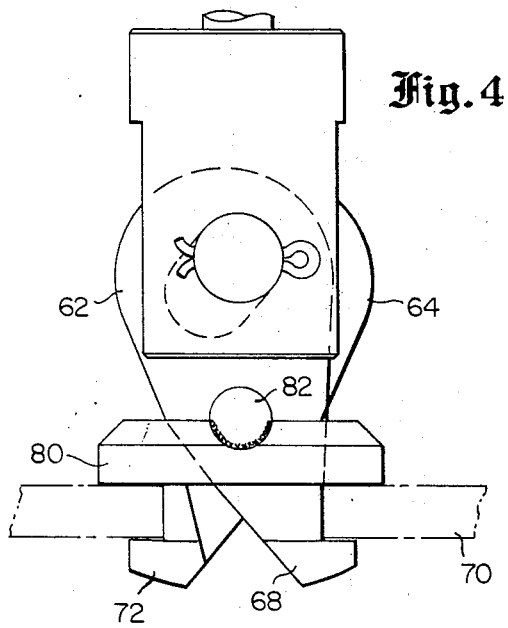
FIG. 4 is a view in side elevation of a connector portion of the chain lashing embodiment.

FIG. 5 is a graph which illustrates that, as the rate of force applied to helical spring 22 increases, the deflection distance of one member with respect to the other member increases non-linearly. As members 10 and 12 and linkages 28 and 30 are pulled into the shape of a parallelogram with constantly varying angles between the sides, the mechanical advantage changes. In other words, as members 10 and 12 get closer together, it takes more force to achieve a unit change in the length of the tension stroke, i.e., relative motion between members 10 and 12 in the direction of the applied forces. Deflection in the coils of helical spring 22 causes a change in the force direction. As a result of this change in force direction, the rate of force increases with deflection distance and thus an increasing non-linear force to deflection ratio is achieved. Thus, the device has the novel characteristic of absorbing energy at a non-linear rate. Non-linear absorption of energy may be achieved with or without the inclusion of linkages 28-31. By variations in coil spacing and linkages, the load versus stroke relationships may be altered by wide factors. The remainder of the drawings and specifications describes various other embodiments of the novel concept of the invention.

With reference to FIG. 6, there is shown another embodiment of the invention comprising a helical spring 22, and a pair of elongated members 84 and 86. Helical spring 22 threads holes 88 in elongated members 84 and 86 as discussed above with respect to the embodiment shown in FIGS. 1-4. The embodiment of FIG. 6 differs from the earlier described embodiment in that it does not have linkages pivotally connecting members 84 and 86. In operation the embodiment of FIG. 6 stores energy in a manner similar to the above-described embodiment except that members 84 and 86 follow a slightly different trajectory. The actual location of the members 84 and 86 at every load level is a point of balance between contracting and expanding elements. The spring segments of helical spring 22 in the embodiment of FIG. 6 function as their own linkage. For example, each expanding segment balances itself against adjacent contracting segments.

Yet another embodiment is illustrated in FIG. 7. In this embodiment a pair of members 90 and 92 are pivotally connected by links 94 and 96. Links 94 and 96 are pivotally mounted on the members by means of pins 32 and keepers 34 as described above. The spring of this embodiment comprises a plurality of individual rings 98 which are adapted to be flexed for storing energy. Each ring 98 is held by a notch 99 in each of the two members 90 and 92. Notches 99 prevent each ring from experiencing undesired movement in the direction of axes along the elongated members 90 and 92. Links 94 and 96 prevent the members 90 and 92 from moving towards one another except when the device is subjected to a load. Note that the spring 98 is positioned at an angle with respect to links 94 and 96, that is with respect to an axis on a line through the pivot points of each link. It is necessary that the rings be positioned at an angle with respect to the links in order for the device to absorb energy. If the plane of each ring 98 were parallel to the axis of the links 94 and 96, movement of the members 90 and 92 would not result in work being done and hence no energy would be stored. In the embodiment of FIG. 7, the application of a load to the members 90 and 92 result in the rings 98 being stretched, i.e., expanded. It would also be possible to construct an embodiment having notches where the notches are on the opposite sides of members 90 and 92. That is, the notches in each member would then face the notches in the opposite member. In operation of the alternate embodiment of FIG. 7, a movement of the bars would result in each ring 98 compressing rather than expanding to store energy.

Referring now to FIG. 8, there is shown an embodiment of the invention having a mounting which makes the device more suitable for use as a spring suspension for an axel or a wheel. The embodiment of FIG. 8 comprises a pair of elongated members 100 and 102, a helical spring 22 and a pair of linkages 94 and 96. As discussed above, the linkages 94 and 96 are pivotally connected to the members 100 and 102 by a plurality of pins 32 and keeprs 34. A keeper 34 is used on each end of the pin. Spring 22 threads holes 102 in members 100 and 101. Members 100 and 102 differ from previously described embodiments in that a means for applying forces to the elongated members comprises a pair of elements 104 and 106 which project horizontally from members 100 and 102. The pair of opposing forces would be applied to this emobidment substantially along the axes of the elongated members defined by a line extending from one pivot pin 32 of an elongated member to the other pivot pin 32 of the same elongated member. In other respects, the operation of the embodiment of FIG. 8 is similar to the operation of the embodiment shown in FIGS. 1 and 2.

Referring now to FIG. 9, there is shown an embodiment of the invention having a pair of elongated members 108 and 110, and a helical spring 112 threading holes 114 in the members. This embodiment differs from the previously described embodiments in that holes 114 are spaced far enough apart from one another so that the spring may be loaded in excess of its elastic limit. A typical spring is capable of absorbing 2 to 2½ times the energy that it is capable of storing. In operation, each spring segment has four different shapes depending upon the loading of the spring. Each segment has a first shape when the spring is unloaded. As the spring is deflected under load, each segment bends to a second shape characterized in that it is the maximum defelction from which full recovery is possible. That is, if the load is removed, the spring will return to its original unloaded condition, i.e., its first shape. In the previously described embodiments, the spring would not absorb energy beyond its elastic limit because of the spacing of the holes. In this embodiment, the holes are spaced far enough apart from one another so that the spring may be bent to a third shape characterized as a position of maximum distortion beyond the limits of elastic strength. As the load is released from the spring, each segment will return to a fourth shape which comprises a partial recovery from the third shape but less than a full recovery to the first or unloaded shape. The spring absorbs energy beyond its elastic limit by converting the energy to heat. The embodiment of FIG. 9 may be used as an energy absorbing device for an auto bumper or other device with a similar purpose. For example, member 108 may be permanently attached to a frame or mount. One end of member 110 may be shaped or connected to a bumper 116 for applying forces to the members. In the event this embodiment is overloaded so that the spring returns to a fourth shape, it is possible to force the spring to return to approximately its original shape by applying a force in the opposite direction from the force that overloaded the spring. For example, in the application of an auto bumper a hydraulic jack could be used to apply a force along the member 110 but in the direction of bumper 116 to force the spring to return to its original position.

I claim:

1. A spring device for storing energy comprising:
   a. a pair of elongated members in juxtaposition, said members having substantially parallel longitudinal axes;
   b. a plurality of spring segments for storing energy, each said spring segment having a first unloaded shape;
   c. means for connecting each said spring segment between said pair of members, each said spring segment bending to a second shape responsive to relative movement in the direction of said longitudinal axes of one of said members with respect to the other in the presence of opposing forces acting on said members in the direction of said longitudinal axes;
   d. each said segment in said spring rotatably connected at a first point to a first member at a predetermined location along said longitudinal axis of said first member, each said segment rotatably connected at a second point substantially opposite from said first point to said second member at a predetermined location on said longitudinal axis of said second member.

2. The device as claimed in claim 1 and further including means for applying forces to said pair of members.

3. The device as claimed in claim 2 wherein said means for applying forces to said pair of members comprises an element connected to each said member at approximately the midpoint along the longitudinal axis of said elongated member, said element projecting from said elongated member in a direction approximately orthogonal to the direction of its longitudinal axis.

4. The device as claimed in claim 2 wherein said plurality of spring segments comprises a continuous coil spring having a plurality of coils connected between said members by said connecting means, each of said coils in said spring connected at a first point to a first member at a predetermined location along said longitudinal axis of said first member, each said coil connected at a second point substantially opposite from said first point to said second member at a predetermined location on said longitudinal axis of said second member whereby a pair of separately acting spring segments in each said coil of said spring is established.

5. The device as claimed in claim 3 wherein the spacing between the first connecting points along said first members and the spacing between the second connecting points along said second member is predetermined sufficiently great to permit said spring segments to bend so that their elastic limit may be exceeded in response to forces acting on said members.

6. The device as claimed in claim 4 wherein each said member includes a plurality of holes having a predetermined spacing along said longitudinal axes and wherein said coil spring is connected to a pair of members by alternately threading a hole along said longitudinal axes of a first one of said members and threading a hole along said longitudinal axis of a second one of said members until each of said coils in spring threads a hole in each of said pair of members, a first segment in said pair of segments in each said coil of said spring bending in compression in response to relative movement between said pair of members and a second segment in each said pair of segments in each said coil of said spring bending in tension in response to said relative movement.

7. The device as claimed in claim 6 wherein said coil spring is circular.

8. The device as claimed in claim 7 wherein said first shape of each said coil comprising a pair of segments is circular, and wherein the second shape of each said segment of each said coil is elliptical.

9. The device as claimed in claim 2 and further including a pair of linkages pivotally connecting said pair of members, said members and linkages substantially forming a trapezoid having variable angles and wherein said relative movement between said members is parallel.

10. The device as claimed in claim 9 wherein the length of each said linkage between said pivotal connections is approximately equal to the mean diameter of each said spring segment.

11. The device as claimed in claim 10 wherein said plurality of spring segments comprises a plurality of rings, each ring having a first and second segment, each said ring positioned along said longitudinal axis of each said member and connected between said pair of members by said connecting means, the direction of a first axis passing through the points of contact of each said ring to said pair of members being angularly offset from the direction of a second axis of at least one of said pair of linkages, the second axis passing through the pivot points of its corresponding linkage.

12. The device as claimed in claim 11 wherein said connecting means comprises a plurality of notches in said pair of members, each said ring being held in a pair of notches.

13. The device as claimed in claim 11 wherein said plurality of spring segments comprises a continuous coil spring connected between said members by said connecting means, each said coil in said coil spring connected at a first point to a first member at a predetermined location along said longitudinal axis of said first member, each coil connected at a second point substantially opposite from said first point to a second member at a predetermined location along said longitudinal axis of said second member to establish a pair of separately acting spring segments in each said coil of said continuous spring coil.

14. The device as claimed in claim 13 wherein said connecting means rigidly connects each said coil and said spring to said pair of members and wherein each said segment in each said coil bends in response to relative movement between said pair of members in the direction of said longitudinal axes.

15. The device as claimed in claim 13 wherein said means for connecting said spring segments to said members comprises a plurality of holes in each said member, said plurality of holes having a predetermined spacing along said longitudinal axis of said member, and wherein said spring is connected to said pair of members by alternately threading a hole along said longitudinal axis of a first one of said members and threading a hole along said longitudinal axis of a second one of said members until each coil in said spring threads a hole in each of said pair of members, a first segment in said pair of segments in each said coil of said spring bending in tension in response to said relative movement between said pair of members and a second segment in each said pair of segments in each said coil of said spring bending in compression in response to said relative movement.

16. The device as claimed in claim 15 wherein said coil spring is circular.

17. The device as claimed in claim 16 wherein said first shape of each said segment is circular and wherein said second shape of each said segment is elliptical.

* * * * *